US006999823B2

(12) United States Patent
Nishizawa et al.

(10) Patent No.: US 6,999,823 B2
(45) Date of Patent: Feb. 14, 2006

(54) POWER SHUT-OFF METHOD FOR INJECTION MOLDING MACHINE

(75) Inventors: Chiharu Nishizawa, Nagano (JP); Osamu Ichikawa, Nagano (JP)

(73) Assignee: Nissei Plastic Industrial Co., Ltd., Nagano-ken (JP)

( * ) Notice: Subject to any disclaimer, the term of this patent is extended or adjusted under 35 U.S.C. 154(b) by 190 days.

(21) Appl. No.: 10/701,607

(22) Filed: Nov. 6, 2003

(65) Prior Publication Data

US 2004/0093097 A1 May 13, 2004

(30) Foreign Application Priority Data

Nov. 7, 2002 (JP) ...................................... 2002-323409

(51) Int. Cl.
*G05B 19/18* (2006.01)

(52) U.S. Cl. ............................ 700/12; 700/13; 700/15; 700/21; 700/79; 700/80; 700/200; 700/204; 425/29; 425/30; 425/151; 425/169

(58) Field of Classification Search .................. 700/12, 700/13, 15, 17, 21, 79, 80, 174, 177, 200, 700/204; 425/29, 30, 169, 155, 151
See application file for complete search history.

(56) References Cited

U.S. PATENT DOCUMENTS 5,093,052 A * 3/1992 Wurl et al. ................ 264/40.1
5,344,301 A * 9/1994 Kamiguchi et al. ......... 425/169
5,780,078 A * 7/1998 Chen .......................... 425/574
5,993,039 A * 11/1999 Crill ............................ 700/79
6,083,399 A * 7/2000 Jameson et al. ............ 210/634
6,338,004 B1 * 1/2002 Usui .......................... 700/200
2003/0228386 A1 * 12/2003 Hidaka ....................... 425/182
2004/0044434 A1 * 3/2004 Morimura .................. 700/197

FOREIGN PATENT DOCUMENTS

JP 8-244083 A 9/1996

* cited by examiner

*Primary Examiner*—Ramesh Patel
(74) *Attorney, Agent, or Firm*—Birch, Stewart, Kolasch & Birch, LLP

(57) ABSTRACT

Even when a power switch is turned off, the controller of an injection molding machine does not shut off a power supply immediately. The controller determines whether the present state of the injection molding machine is a previously-set confirmation-requiring state, such as a lockup state of a mold clamping unit using a toggle link mechanism, or a nozzle touch state of an injection unit. When the present state is not the confirmation-requiring state, the controller shuts off the power supply. When the present state is the confirmation-requiring state, the controller displays on a display screen a confirmation window for confirmation of power shut off. The controller shuts off the power supply in accordance with a shut-off operation performed on the basis of the confirmation window.

12 Claims, 5 Drawing Sheets

POWER SHUT-OFF METHOD FOR INJECTION MOLDING MACHINE

This Nonprovisional application claims priority under 35 U.S.C. §119(a) on Patent Application No(s). 2002-323409 filed in JAPAN on Nov. 7, 2002, the entire contents of which are hereby incorporated by reference.

BACKGROUND OF THE INVENTION

1. Field of the Invention

The present invention relates to a power shut-off method for an injection molding machine suitable for use in shutting off electrical power supply (hereinafter simply referred to as "power") by use of a power switch.

2. Description of the Relevant Art

Generally, a molding process of an injection molding machine involves a lockup state of a mold clamping unit having a toggle link mechanism (in mold clamping step), and a nozzle touch state of an injection unit (in an injection step), etc., in which high pressure is applied to relevant components.

When power is shut off while high pressure is applied to relevant components, the state in which high pressure is applied to relevant components continues even after power shut off, because a drive section for applying the high pressure stops while maintaining the high pressure. This causes a failure or deterioration in an early stage (short life). Therefore, in an injection molding machine, some measure must be taken in order to cope with unexpected power shut-off in the middle of a step in which high pressure is applied to relevant components.

A conventional measure for coping with a power failure, which is unexpected power shut-off, is a mold-clamping selection method for a toggle-type mold clamping apparatus disclosed in Japanese Patent Application Laid-Open (kokai) No. 8(1996)-244083. Under this mold-clamping selection method, an offset amount of a toggle link mechanism of the toggle-type mold clamping apparatus is set by use of a setting device, and when power is shut off in the middle of a mold clamping step, the toggle link mechanism is selectively brought into a locked state or an unlocked state.

However, the above-described conventional power shut-off method (mold-clamping selection method) is based on the premise that when power is shut off, the interruption of a molding process stemming from power shut-off cannot be avoided. Incidentally, unexpected power shut-off occurs not only in the case of power failure but also in the event of other accidents; e.g., in the case where an operator mistakenly turns the power switch off when mistaking a different switch for the power switch, and the case where an article hits the power switch and turns the power switch off. In such a case, the conventional power shut-off method (mold-clamping selection method) shuts off the power immediately, whereby a molding process is interrupted, resulting in a drop in productivity and a delay in production schedule. Moreover, when an unlock state is selected, an unexpected operation may take place, possibly impairing the safety of the operator.

SUMMARY OF THE INVENTION

An object of the present invention is to provide a power shut-off method for an injection molding machine which can avoid interruption of a molding process caused by an unexpected power shut-off and which can eliminate a drop in productivity or a delay in production schedule, which would otherwise occur because of the interruption.

Another object of the present invention is to provide a power shut-off method for an injection molding machine which can prevent occurrence of an unexpected operation even when a power switch is mistakenly turned off, to thereby contribute to improvement of safety.

To achieve the above objects, the present invention provides a power shut-off method for an injection molding machine, comprising the steps of: determining, in response to turn off of a power switch, whether a present state of the injection molding machine is a previously-set confirmation-requiring state which requires a confirmation before power is shut off; shutting off the power when the present state is not the confirmation-requiring state; and displaying on a display a confirmation window for confirmation of power shut off, without shutting off the power, when the present state is the confirmation-requiring state, and shutting off the power in accordance with a shut-off operation performed on the basis of the confirmation window.

DETAILED DESCRIPTION OF THE PREFERRED EMBODIMENT

An embodiment of the present invention will next be described in detail with reference to the drawings. The accompanying drawings are illustrative of the embodiment and are not meant to limit the scope of the invention. In order to describe the invention clearly, detailed description of known features is omitted.

The configuration of an injection molding machine M which employs a power shut-off method according to the present embodiment will be described with reference to FIGS. 2 and 3.

Figure 2:
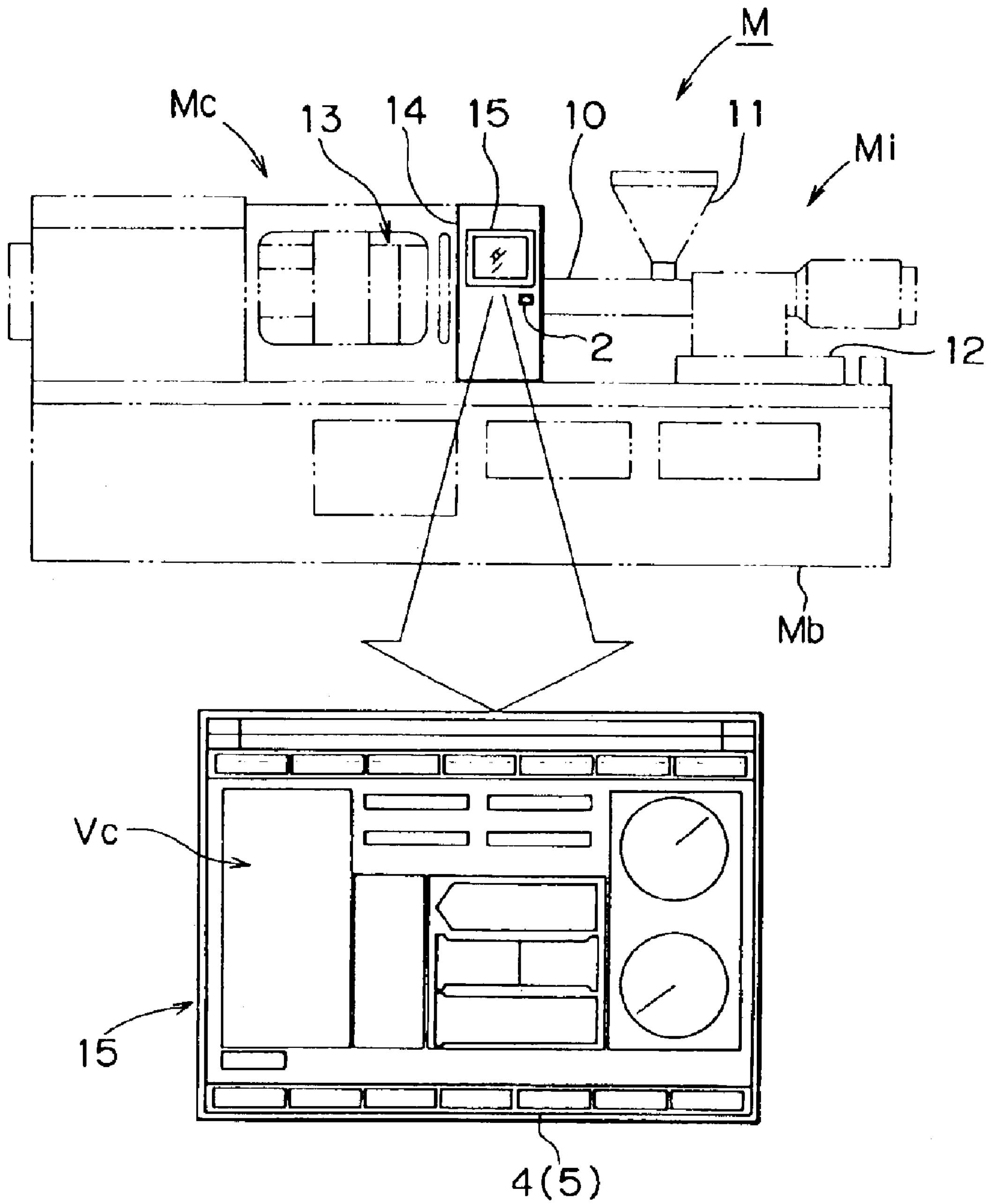
FIG. 2 is a schematic diagram of an injection molding machine to which the power shut-off method can be applied.

The injection molding machine M, which is depicted by an imaginary line in FIG. 2, includes a machine base Mb; and an injection unit Mi and a mold clamping unit Mc, which are disposed on the machine base Mb. The injection unit Mi includes a heating barrel 10; an unillustrated injection nozzle attached to the front end of the heating barrel 10; and a hopper 11 disposed on a rear portion of the heating barrel 10 and adapted to supply a material to the heating barrel 10. Meanwhile, the mold clamping unit Mc includes a mold 13 consisting of a movable mold half and a stationary mold half. The injection unit Mi is advanced and retracted by means of an injection unit moving mechanism 12. When the injection unit Mi is advanced, the injection unit Mi enters a nozzle touch state in which the injection nozzle is in pressure contact with the mold 13. The mold clamping unit Mc is a so-called toggle-type mold clamping unit, which uses a toggle link mechanism. When the mold clamping unit Mc clamps the mold 13 under high pressure, the mold clamping unit Mc enters a lockup state. Moreover, a side panel 14 is disposed upright on the machine base Mb; and a display unit 15 is disposed on the side panel 14. The display unit 15 includes a display 4, such as a color liquid-crystal display, combined with a touch panel 5. The display unit 15 is connected to a controller 20 (FIG. 3) accommodated within the machine base Mb.

Figure 3:
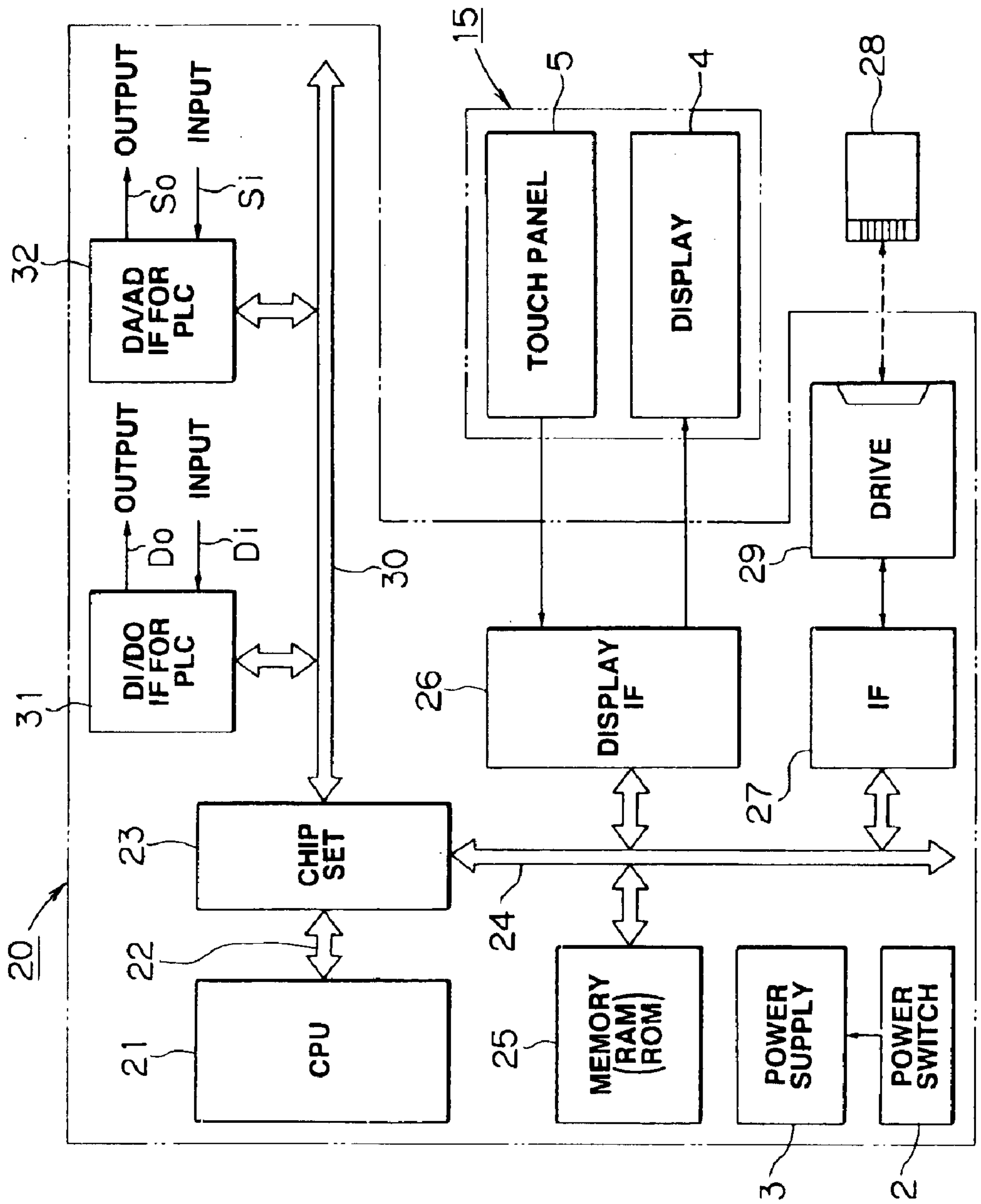
FIG. 3 is a functional block diagram of a controller provided in the injection molding machine.

FIG. 3 shows a block diagram of the controller 20. Reference numeral 21 denotes a CPU, to which a chip set 23 is connected via an internal bus 22. A bus line. 24, formed of a local bus such as a PCI bus, is connected to the chip set 23 in order to form an HMI (human machine interface) control system. In order to form the HMI system, an internal memory section 25, including various types of memory such as RAM and ROM, is connected to the bus line 24. Further, the above-mentioned display unit 15 is connected to the bus line 24 via a display interface 26; and a drive unit 29 for reading data from and writing data to a storage medium 28 such as a memory card is connected to the bus line 24 via an input/output interface 27.

Meanwhile, a bus line 30, similar to the bus line 24, is connected to the chip set 23 in order to form a PLC (programmable logic controller) control system. For formation of the PLC system, input/output interfaces 31 and 32 are connected to the bus line 30. The input/output interface 31 receives switch data Di output from switches, etc., and feeds them to the CPU 21. Further, the input/output interface 31 receives control instruction data Do output from the CPU 21 and feeds them to corresponding actuators. The input/output interface 32 converts analog detection signals Si from various sensors to corresponding digital signals, and feeds the digital signals to the CPU 21. Further, the input/output interface 32 converts digital control instruction data from the CPU 21 to corresponding analog control signals So, and feeds the analog control signals So to the corresponding actuators. Thus, predetermined feedback control systems and open-loop control systems are configured.

Therefore, the above-describe internal memory section 25 stores a PLC program and an HMI program, as well as various other processing programs. Notably, the PLC program is software which realizes, for example, sequence operations of the injection molding machine M in various steps, and monitoring of the injection molding machine M. The HMI program is software which realizes, for example, setting and display of operation parameters of the injection molding machine M, and display of operation monitor data of the injection molding machine M. These programs are configured as an architecture peculiar to the injection molding machine M, which includes the controller 20.

Moreover, reference numeral 3 denotes a power supply. This power supply 3 represents not only a power supply for supplying low-voltage DC power to the controller 20, but also a power supply for driving the entirety of the injection molding machine M. A power switch 2 is connected to the power supply 3. When the power switch 2 is turned on, supply of power to the injection molding machine M is started. When the power switch 2 is turned off, supply of power to the injection molding machine M is shut off in accordance with the power shut-off method according to the present embodiment. As shown in FIG. 2, the power switch 2 is provided independently on the side panel 14 at a predetermined location.

Figure 1:
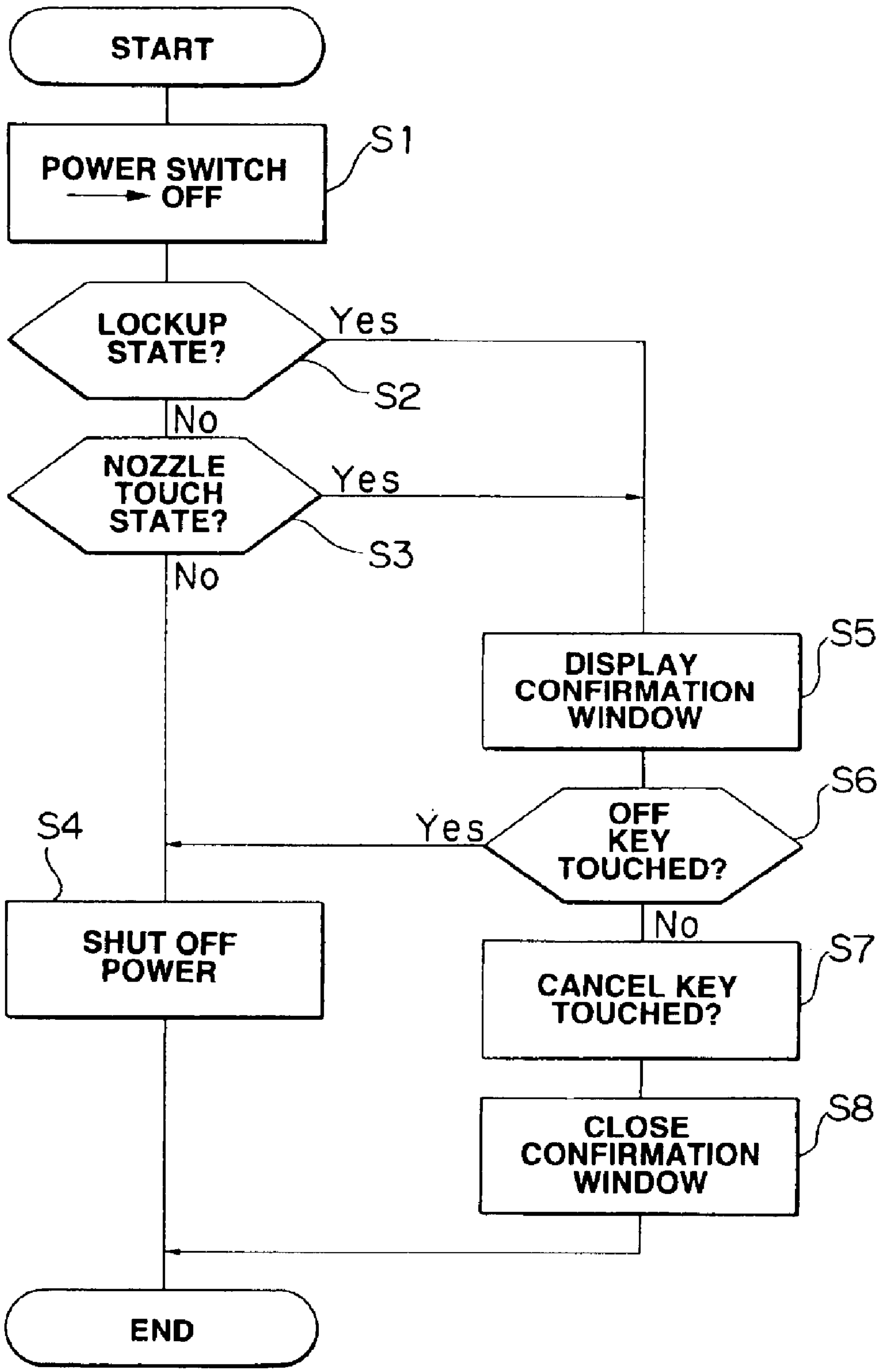
FIG. 1 is a flowchart showing the processing steps of a power shut-off method according to an embodiment of the present invention.

Next, the power shut-off method according to the present embodiment will be described in accordance with the flowcharts of FIG. 1 and with reference to FIGS. 2 to 6.

The injection molding machine M is assumed to be currently operated so as to perform a predetermined molding process, which may be an automatic molding process or a manual molding process. Here, there is assumed the case where the power switch 2 is turned off in the middle of the molding process (step S1). Notably, the case where the power switch 2 is turned off includes not only cases of unexpected power shut-off operation, such as the case where an operator mistakenly turns the power switch 2 off as a result of mistaking a different switch for the power switch 2, and the case where an article hits the power switch 2 and turns the power switch 2 off, but also the case where the operator intentionally turns the power switch 2 off at a proper timing.

The controller 20 monitors the state of the power switch 2. When the power switch 2 is turned off, the controller 20 determines whether the present state of the injection molding machine M matches one of previously set confirmation-requiring states (steps S2 and S3), without shutting off the power supply 3. In this case, the previously set confirmation-requiring states include a lockup state of the mold clamping unit Mc and a nozzle touch state of the injection unit Mi. The lockup state of the mold clamping unit Mc refers to a state where high-pressure mold clamping is effected by means of a toggle link mechanism, and the movable mold half and the stationary mold half of the mold 13 are in mutual contact at the highest pressure. The nozzle touch state of the injection unit Mi refers to a state where the injection nozzle of the injection unit Mi is in pressure contact with the mold 13 (stationary mold half). In either case, upon continuation of the state over a long time, a failure or deterioration may occur at an early stage (short life) stemming from high pressure (or high temperature). The detection of the lockup state and the nozzle touch state may be performed by use of instruction values provided within the controller 20 or by use of physical values detected by sensors (i.e., detection values output from the sensors).

Figure 4:
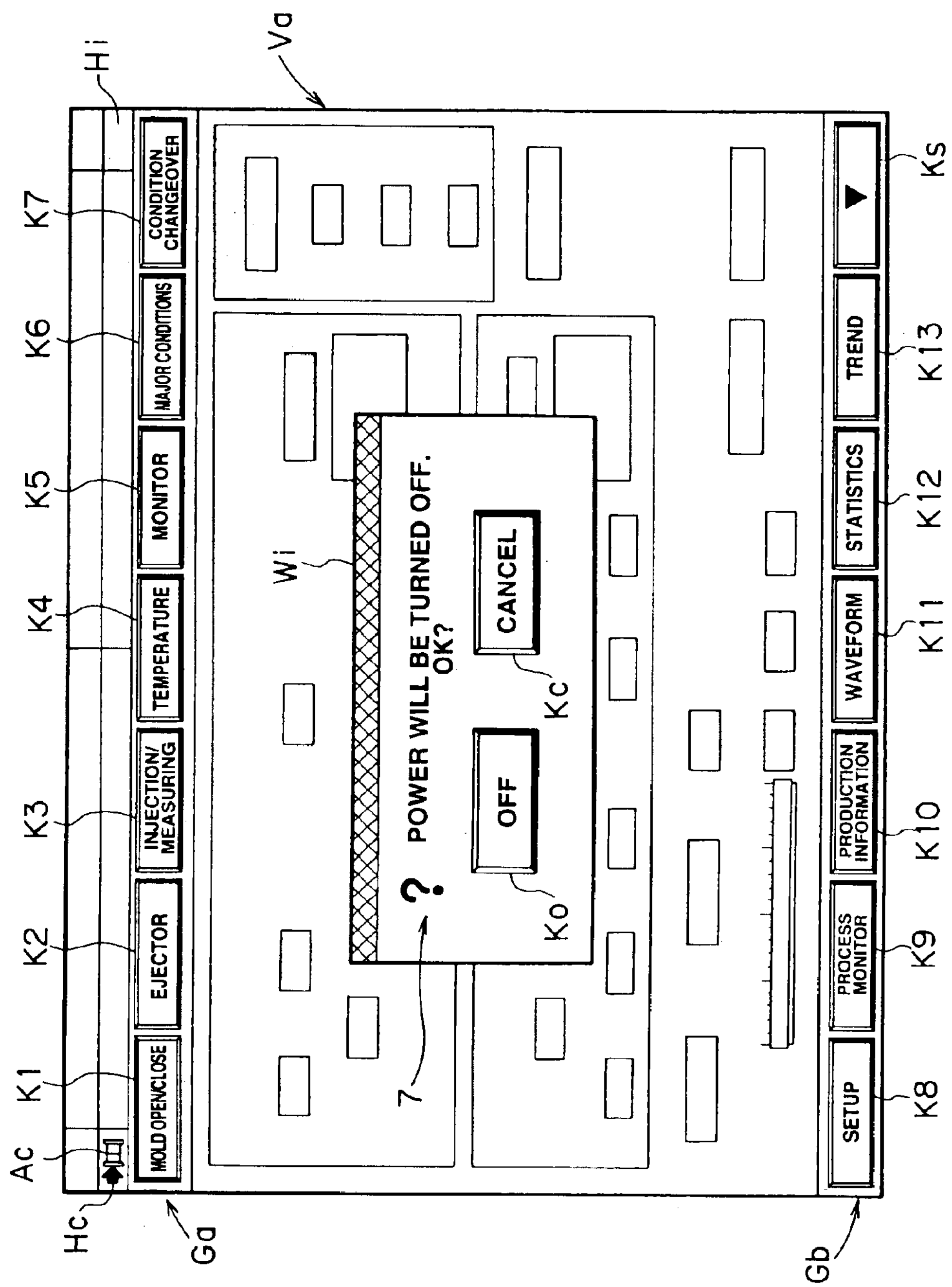
FIG. 4 is a diagram of a screen on which is displayed a confirmation window used in the power shut-off method.

When the present state of the injection molding machine M matches neither of the confirmation-requiring states, the controller 20 shut off the power supply 3 immediately (steps S2, S3, S4). In contrast, when the present state of the injection molding machine M matches one or both of the confirmation-requiring states; i.e., the lockup state of the mold clamping unit Mc and/or the nozzle touch state of the injection unit Mi, the controller 20 displays on the display 4 a confirmation window Wi as shown in FIG. 4 (steps S2, S3, S5). Here, the mold clamping unit Mc is assumed to be in a lockup state.

The display 4 displays a setting screen Va for mold opening and closing. This setting screen Va allows an operator to set various operation conditions for the mold opening-closing step and to monitor the operation. This setting screen Va will be described briefly. A plurality of screen selection keys K1, K2, K3, etc., which correspond to different screens Va, etc., and are used to select the respective screens are displayed in an upper row and a lower row of the setting screen Va. These screen selection keys KI, etc., are classified in accordance with their frequencies of use. Specifically, a first group Ga of keys relating to setting of operation conditions of the molding machine, such as a mold open/close screen selection key K1, an ejector screen selection key K2, an injection/measuring screen selection key K3, a temperature screen selection key K4, a monitor screen selection key K5, a major condition screen selection key K6, and a condition changeover screen selection key K7, are disposed in the upper row in such a manner that these keys are arranged along a single horizontal row, whereas a second group Gb of keys, including the remaining keys; i.e., a setup screen selection key K8, a process monitor screen selection key K9, a production information screen selection key K10, a waveform screen selection key K11, a statistics screen selection key K12, and a trend screen selection key K13, are disposed in the lower row in such a manner that these keys are arranged along a single horizontal row.

The screen selection keys K1, etc., are similarly displayed even when the setting screen Va is switched to a different screen. For example, FIG. 2 schematically shows a process monitor screen Vc selected upon operation of the process monitor screen selection key K9, and in this screen as well, the screen selection keys K1, etc. are displayed in the same shape and at the same locations as in the setting screen Va shown in FIG. 4. Notably, the keys of the second group Gb shown in FIG. 4 are located on the first hierarchical level. When a screen level switching key Ks at the right end of the screen is touched, a history screen selection key, a program screen selection key, a signal recorder screen selection key, a diagnosis screen selection key, etc., which are on the second hierarchical level, are displayed in a similar manner, in place of the screen selection keys K8 to K13. Moreover, the controller 20 has an arrangement change function for enabling a user to arbitrarily change the arrangement of the screen selection keys K1, etc., and an arrangement storage function for storing the changed arrangement. This allows the user to freely change the arrangement (order) of the screen selection keys K1, etc. in consideration of easiness of use. By virtue of the above-described layout display, even when the titles displayed on the respective screen selection keys K1, etc. are to be changed, such change can be easily performed by means of software, thereby reducing man-hours and cost stemming from the change. In addition, the visibility and easiness of operation of the screen selection keys K1, etc. can be enhanced.

The above-described confirmation window Wi is displayed at the approximate center of the setting screen Va (window display). In the confirmation window Wi, an OFF key Ko for shutting off the power and a cancel key Kc for canceling the power shut off are displayed, and operations of these keys are detected by the touch panel 5. A message display area 7 is provided in the confirmation window Wi so as to display a message; e.g., "Power will be turned off. OK?"

Figure 5:
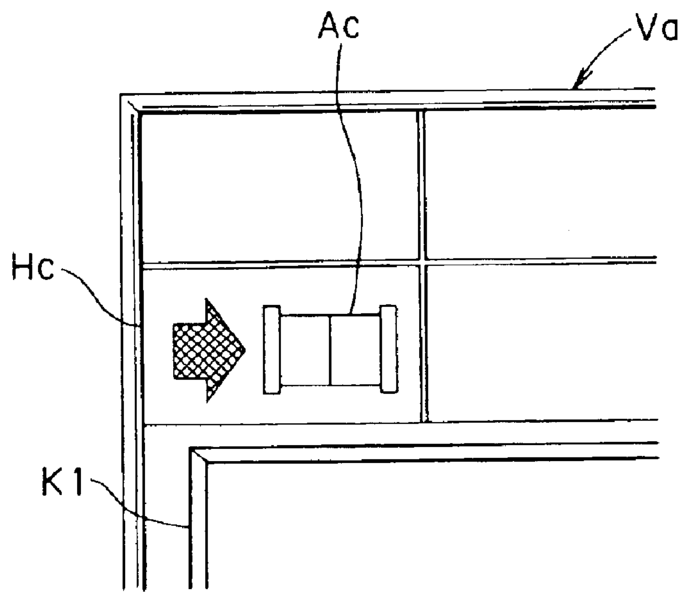
FIG. 5 is a diagram showing an icon displayed in a display section and used in the power shut-off method.

Further, the present state of the injection molding machine M matches a confirmation-requiring state, and this is displayed in a predetermined display section Hc of the display 4. Specifically, as shown in FIG. 5 (FIG. 4), an icon Ac depicting the mold in a lockup state is displayed in the display section Hc, which is provided at the upper left corner of the screen Va displayed on the display 4. Notably, when the mold is not in a lockup state, the icon Ac is not displayed in the display section Hc. The display section Hc in which such an icon Ac is displayed enables the operator to clearly know, without fail, that the mold clamping unit Mc is in a lockup state.

Meanwhile, when the operator has confirmed that the mold clamping unit Mc is in a lockup state and determines that no problem will arise even when the power supply 3 is shut off, the operator may shut off the power supply 3 by touching the OFF key Ko (steps S6, S4). Notably, before the power supply 3 is shut off, the controller 20 checks whether any opened file is present, and, if so, performs file closing processing in order to close the file(s). Further, the controller 20 checks whether data to be stored have been written into a memory, and, if unstored data are present, performs write processing in order to write such data into a nonvolatile memory. This operation eliminates problems in relation to software, such as loss of file data and generation of errors, which would otherwise occur upon shut off of the power.

After completion of the above operation, processing for actually turning the power supply 3 off is performed. In contrast, in the case of unexpected power shut-off operation; e.g., when an operator mistakenly turns the power switch 2 off as a result of the operator's mistaking a different switch for the power switch 2, or when an article hits the power switch 2 and turns the power switch 2 off, the operator knows of such an undesired power shut-off operation from the confirmation window Wi. In such a case, the operator touches the cancel key Kc in the confirmation window Wi in order to stop the undesired power shut-off operation. Thus, the power shut-off operation is interrupted, and the confirmation window Wi is closed (steps S7, S8).

Figure 6:
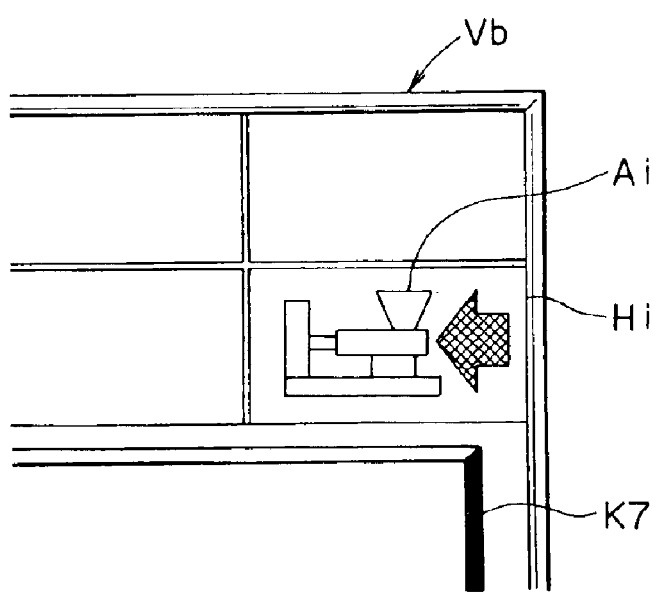
FIG. 6 is a diagram showing another icon displayed in the display section and used in the power shut-off method.

Moreover, when a power shut-off operation is performed when the injection unit Mi is in a nozzle touch state, a similar confirmation window Wi is displayed, and, as shown in FIG. 6, an icon Ai depicting the injection unit in a nozzle touch state is displayed in a display section Hi, which is provided at the upper right corner of the screen (injection/measuring screen) Vb displayed on the display 4. Notably, when the injection unit is not in a nozzle touch state, the icon Ai is not displayed in the display section Hi (see FIG. 4).

As described above, under the power shut-off method according to the present embodiment, when the power switch 2 is turned off, without shutting off the power supply 3, the controller 20 determines weather the present state of the injection molding machine M is a previously-set confirmation-requiring state (i.e., a lockup state of the mold clamping unit Mc or a nozzle touch state of the injection unit Mi); when the present state is not the confirmation-requiring state, the controller 20 shuts off the power supply 3; and when the present state is the confirmation-requiring state, the controller 20 displays the confirmation window Wi on the display 4, and shuts off the power supply 3 in accordance with a shut-off operation performed by the operator on the basis of the confirmation window Wi. Therefore, the power shut-off method according to the present embodiment can avoid interruption of a molding process caused by an unexpected power shut-off and thus can eliminate problems, such as a decrease in productivity and a delay in production schedule, which would otherwise occur because of the interruption. Moreover, the power shut-off method can prevent occurrence of an unexpected operation, to thereby contribute to improvement of safety. In particular, when the present state of the injection molding machine M is a confirmation-requiring state, this is displayed in the display section Hc or Hi of the display 4 by means of the icon Ac or Ai, so that the operator can know clearly without fail that the present state requires a confirmation before power shut off.

While the present invention has been described with reference to the preferred embodiment, the present invention is not limited thereto. Regarding structural details, arrangement, quantity, methods, among others, modifications and any omission or addition may be possible as needed without departing from the scope of the invention.

In the above-described embodiment, a lockup state of the mold clamping unit Mc using a toggle link mechanism and a nozzle touch state of the injection unit Mi have been mentioned as predetermined confirmation-requiring states. However, use of other states is not excluded. Although the above-described embodiment exemplifies the case where the OFF key Ko displayed in the confirmation window Wi is used to perform shut off operation on the basis of the confirmation window Wi, this turn-off procedure may be modified in such a manner that only a message is displayed in the confirmation window Wi, and the operator operators the power switch 2 again on the basis of this message. Moreover, a warning message; e.g., "Mold clamping unit is in lockup state." may be displayed by use of the confirmation window Wi. In the above-described embodiment, information indicating that the injection molding machine M is currently in a confirmation-requiring state is displayed in the display section Hc or Hi provided on the display 4 by use of an icon. However, such information may be displayed in the confirmation window Wi. Moreover, such information may be displayed in a different form; e.g., in the form of a message written in characters.

What is claimed is:

1. A power shut-off method for an injection molding machine, comprising the steps of:

determining, in response to turn off of a power switch, whether a present state of the injection molding machine is a previously-set confirmation-requiring state which requires a confirmation before power is shut off;

shutting off the power when the present state is not the confirmation-requiring state; and displaying on a display a confirmation window for confirmation of power shut off, without shutting off the power, when the present state is the confirmation-requiring state, and shutting off the power in accordance with a shut-off operation performed on the basis of the confirmation window.

2. A power shut-off method for an injection molding machine according to claim 1, wherein the confirmation-requiring state is a lockup state of a mold clamping unit using a toggle link mechanism.

3. A power shut-off method for an injection molding machine according to claim 2, wherein the lockup state is determined on the basis of at least one of an instruction value within a controller and a detection value output from a sensor.

4. A power shut-off method for an injection molding machine according to claim 2, wherein when the present state is the confirmation-requiring state, information indicating that the present state is the confirmation-requiring state is displayed in a predetermined display section of the display.

5. A power shut-off method for an injection molding machine according to claim 1, wherein the confirmation-requiring state is a nozzle touch state of an injection unit.

6. A power shut-off method for an injection molding machine according to claim 5, wherein the nozzle touch state is determined on the basis of at least one of an instruction value within a controller and a detection value output from a sensor.

7. A power shut-off method for an injection molding machine according to claim 5, wherein when the present state is the confirmation-requiring state, information indicating that the present state is the confirmation-requiring state is displayed in a predetermined display section of the display.

8. A power shut-off method for an injection molding machine according to claim 1, wherein an OFF key for shutting off the power and a cancel key for canceling the power shut off are displayed within the confirmation window, and operations of the OFF key and the cancel key are detected by use of a touch panel.

9. A power shut-off method for an injection molding machine according to claim 1, wherein the confirmation window includes a message display area, and a message is displayed in the message display area.

10. A power shut-off method for an injection molding machine according to claim 1, wherein a determination at to whether an opened file is present is performed when the power is shut off, and when an opened file is present, file closing processing is performed in order to close the opened file.

11. A power shut-off method for an injection molding machine according to claim 1, wherein a determination at to whether data to be stored have been stored into a memory is performed when the power is shut off, and when the data have not yet been stored, write processing is performed in order to write the data into a nonvolatile memory.

12. A power shut-off method for an injection molding machine according to claim 1, wherein the power switch is independently provided on a side panel at a predetermined position.

* * * * *